United States Patent
Kang et al.

(10) Patent No.: US 8,452,183 B2
(45) Date of Patent: May 28, 2013

(54) TRANSMITTER OF MULTIMEDIA DATA

(75) Inventors: In Won Kang, Seoul (KR); Ho Joon Park, Seongnam-si (KR)

(73) Assignee: Won Yoon-Kyung, Seoul (KR)

( * ) Notice: Subject to any disclaimer, the term of this patent is extended or adjusted under 35 U.S.C. 154(b) by 467 days.

(21) Appl. No.: 12/740,565

(22) PCT Filed: Oct. 30, 2008

(86) PCT No.: PCT/KR2008/006404
§ 371 (c)(1),
(2), (4) Date: Apr. 29, 2010

(87) PCT Pub. No.: WO2009/057957
PCT Pub. Date: May 7, 2009

(65) Prior Publication Data
US 2010/0260502 A1 Oct. 14, 2010

(30) Foreign Application Priority Data
Oct. 30, 2007 (KR) .................. 10-2007-0109631

(51) Int. Cl.
*H04B 10/10* (2006.01)
*H04B 10/114* (2006.01)

(52) U.S. Cl.
CPC .................. *H04B 10/1149* (2013.01)
USPC .................. 398/127; 398/128; 398/130

(58) Field of Classification Search
USPC .................. 398/127, 128, 130
See application file for complete search history.

(56) References Cited

U.S. PATENT DOCUMENTS 8,180,225 B2 * 5/2012 Werthen et al. ............... 398/171
2007/0286610 A1 * 12/2007 Ishibashi .................. 398/197

FOREIGN PATENT DOCUMENTS

| JP | 2004282312 A | | 10/2004 |
| JP | 2005167867 | | 6/2005 |
| JP | 2005167867 A | * | 6/2005 |
| KR | 100419423 B1 | | 2/2004 |
| KR | 100652355 B1 | | 11/2006 |

OTHER PUBLICATIONS

International Search Report dated Aug. 28, 2009 for PCT/KR2008/006404.

* cited by examiner

*Primary Examiner* — Danny Leung
(74) *Attorney, Agent, or Firm* — Fleit Gibbons Gutman Bongini & Bianco; Jose Gutman

(57) ABSTRACT

Disclosed is a multimedia data transmitter that can transmit multimedia data such as image, voice and control signal whose media are different from each other through an optical transmission medium such as plastic or glass optical cables to a short or long distance area. The multimedia data transmitter includes: a digital signal processing logic, converting multimedia data transmitted in different transmission formats into data of a single transmission format, converting parallel image data into serial image data; an interface control logic, generating a control signal for transmission of the data converted by the digital signal processing logic, interfacing interface data; an optical driver, performing optical transmission of the serial data generated by the digital signal processing logic according to the control signal generated by the interface control logic, processing an optical-to-electrical converted signal.

7 Claims, 5 Drawing Sheets (a)

(b)

(a)

(b)

(a)

(b)

(c)

TRANSMITTER OF MULTIMEDIA DATA

TECHNICAL FIELD

The present invention relates to a multimedia data transmitter using an optical cable, and more particularly, to a multimedia data transmitter that can transmit multimedia data such as image, voice and control signal whose media are different from each other through an optical transmission medium such as plastic or glass optical cables to a short or long distance area.

BACKGROUND ART

In a conventional chip (IC) for communication, a S-ATA method is used in a case of near distance, and an LVDS (Low Voltage Differential Signaling) method is used in a case of short distance, and a TMDS (Transition Minimized Differential Signaling) method is used in a case of middle distance.

The LVDS is a circuit for serially transmitting data in a low amplitude differential signaling method using electric potential difference between both ends of a resistance. The LVDS is a method for transmitting digital information through a copper cable to a flat panel display (TFT-LCD) at a high speed in a method suitable for high-frequency transmission. In other words, the LVDS is a transmission method for transmitting digital information to the flat panel display through the copper cable at high speed. In the term 'LVDS', 'LV' means a low voltage. That is, it means that the LVDS uses 3.3 or 1.5V instead of a standard voltage of 5V. The LVDS has been widely used in a laptop computer because it uses less cables between a motherboard and a panel. It has been widely used between image scaler and panel of many stand-alone flat panel displays. The LVDS transmits serial data at the maximum speed of 1 Gbps. The low voltage signal swing and current mode driver voltage output cause very low noise and require low power consumption that is almost constant at any frequency. In addition, differential data transmission used in the LVDS is less affected by common mode noise. The technology has been developed to provide high-speed data transmission function to various communication infrastructure applications such as a base station, household appliances such as a switch, an add/erase multiplexer and a set-top box, a home/commercial image link, a medical ultrasonic imaging and a digital copier. In addition, the technology provides flexibility of system division.

The LVDS provides a flexible architecture in which a system designer can arrange analog/digital signal processing block on an additional board and transmit digitized data from an analog/digital (A/D) converter through a cable or a rear surface.

Digital Visual Interface (DVI) or High Definition Multimedia Interface (HDMI) uses a digital transmission protocol such as a TMDS (Transition minimized differential signaling) link. Accordingly, signal conversion chipsets such as a TMDS transmitter or a TMDS receiver of a TMDS link type are required to support the DVI. The link has been developed by Silicon Image Inc. of U.S. and became a worldwide standard. It can transmit digital data from a graphic card to a monitor by including a transmitter at the graphic card and a receiver at the monitor. An object of the TMDS link is to convert digital data output from a PC into a signal that can be transmitted to the more far distance in the higher band through the longer cable without signal loss. That is the reason that the digital signal outputted directly from the PC is weak and thus cannot be transmitted to a long distance. When a PC is close to a monitor just like a notebook, digital signal have been transmitted between the PC and monitor by using the LVDS method. However, according to the method, the transmission distance is 5 m at maximum. Accordingly, the method is impossible to transmit the digital signal to the relatively long distance, for example the distance between a desktop PC and a monitor. Thus, the new method, that is, the TMDS link method has been developed. The TMDS can be operated at 165 MHz. A single 10-bit TMDS link has a bandwidth of 1.65 Gbps and thus the link can operate in the speed when a digital image signal of 1920×1080 resolution is transmitted at 60 Hz.

The difference between the methods is based on the distance between transmitting and receiving ends. Each transmission method uses a serial method in common. Development of the methods have increased the transmission speed of multimedia data between a hard drive and a mother board, a laptop PC body and an LCD monitor, and from a desktop PC body and an LCD monitor.

However, in the platforms using the transmission methods, the transmission speed are increased more or less but there is almost no difference from the conventional method in noise caused by environments such as electromagnetic wave (EMI) and disturbance, resolution and a simple transmission line. In addition, there have been many problems that the conventional transmission method could not have solved in cases where only monitors are connected to a server without several PCs, and data in the PC body is transmitted to the monitor from very far distance or the PC body or monitor is remotely controlled.

There has been proposed a method using an optical cable to solve the problems occurring in the long distance transmission. When the optical cable is used, it is possible to solve problems such as the long distance data transmission and electromagnetic wave (EMI).

FIGS. 1a and 1b show examples of transmitting and receiving ends of an optical transmission IC using a conventional optical cable.

FIG. 1a shows the transmitting end of the conventional optical transmission IC. A reference number 11 indicates an image card of a personal computer body, a reference number 12 indicates a camera and a reference number 13 indicates a set-top box. In addition, a reference number 14 indicates a transmission chip, which includes a parallel/serial conversion logic 14a converting parallel data into serial data and a drive logic 14b performing optical transmission of the converted serial data.

A reference number 15 indicates an optical transmission drive unit including a plurality of VCSEL drive ICs generating inputted TMDS/LVDS format serial data into an analog optical signal, and a reference number 16 indicates an optical signal generator generating an optical signal by interlocking with the optical transmission drive unit 15, transmitting the signal to an optical cable (a plastic optical cable of 250 μm or a glass optical cable of 62.5 μm). In addition, the optical signal generator 16 includes a plurality of optical signal generating elements.

A reference number 17 indicates a logic IC transmitting DDC data generated from the set-top box 13, interfacing the DDC data transmitted from a receiving end to the set-top box 13. A reference number 18 indicates a DDC data drive unit generating the DDC data into an analog optical signal or converting a received analog signal into an electrical signal. The DDC data driving unit 18 includes a VCSEL drive IC 18a generating DDC data into an analog optical signal, transmitting the signal and a photodiode receiver IC 18b converting a converted electrical signal into DDC data.

A reference number 19 indicates an optical signal generator and receiver transmitting an optical signal to an optical cable by operating with the DDC data drive unit 18 or receiving an optical signal transmitted from the optical cable. The optical signal generator and receiver includes an optical signal generator 19a generating an optical signal by operating with the VCSEL drive IC 18a and an optical signal receiver 19b receiving an optical signal transmitted from the optical cable.

FIG. 1b shows a receiving end of a conventional optical transmission IC. A reference number 21 indicates an optical signal receiver receiving an optical signal transmitted through an optical cable (a plastic optical cable of 250 µm or a glass optical cable of 62.5 µm) and the optical signal receiver 21 includes a plurality of optical signal receiving elements.

A reference number 22 indicates a photodiode receiver converting a signal received from the optical signal receiver 21 into TMDS/LVDS format non-serial data, which includes a plurality of photodiode receiver ICs.

A reference 23 indicates an optical signal receiver and generator receiving an optical signal transmitted from the optical signal receiver 21 or converting DDC data into an optical signal, transmitting the signal to the optical cable. The optical signal receiver and generator includes an optical signal receiver 23a receiving the optical signal transmitted from the optical cable and an optical signal generator 23b generating an optical signal and transmitting the signal to an optical cable.

A reference number 25 indicates a logic IC receiving the DDC data generated from the set-top box and transmitting the DDC data to the set-top box. A reference number 26 indicates a receiving IC, which includes a receiving logic 26a receiving TDMS/LVDS format data converted into an electrical signal and a non-serial logic 26b converting the TMDS/LVDS format data received from the receiving logic 26a into TTL data of Dec. 24, 1948 bit, transmitting the converted TTL data to a TFT-LCD panel 27 or a PDP panel 28.

ICs for using the conventional cable are used to transmit only video and audio signals of PC, HDTV, etc. Accordingly, the ICs cannot be used in various fields and can be used in limited fields such as a PC body and an LCD monitor (PDP monitor) as shown in FIGS. 1a and 1b.

Accordingly, usability of expensive IC and cable is restricted to the limited fields.

In addition, the conventional optical transmission IC for a specific use is designed not to interrelate with LVDS or TMDS mode, and so limitedly used to characteristics of media, transmission distance and so on.

DISCLOSURE OF INVENTION

Technical Problem

Accordingly, the present invention is to solve problems generated from decrease of efficiency of the conventional high-priced optical transmission IC and optical cable.

An object of the present invention is to provide a multimedia data transmitter that can transmit multimedia data having different media such as an image, voice and a control signal through an optical transmission medium such as a plastic or glass optical cable to a short or long distance.

An another object of the present invention is to provide a multimedia data transmitter that can perform transmission of various multimedia data and communication of various interface signals with one chip, simultaneously using an optical cable instead of a coaxial cable in contents restricted and limited to conventional multimedia transmission medium and transmission chips.

Technical Solution

According to an aspect of the present invention, there is provided a multimedia data transmitter, which includes: a digital signal processing logic, converting multimedia data transmitted in different transmission formats into data of a single transmission format, converting parallel image data into serial image data; an interface control logic, generating a control signal for transmission of the data converted by the digital signal processing logic, interfacing interface data; an optical driver, performing optical transmission of the serial data generated by the digital signal processing logic according to the control signal generated by the interface control logic, processing an optical-to-electrical converted signal.

According to another aspect of the present invention, there is provided a multimedia data transmitter, which includes: a digital signal processing logic, converting multimedia data transmitted in different transmission formats into data of a single transmission format, converting parallel image data into serial image data; an interface control logic, generating a control signal for transmission of the data converted by the digital signal processing logic, interfacing interface data; and an optical driver, performing optical transmission of the serial data generated by the digital signal processing logic or data transmitted directly from an external contact module according to the control signal generated by the interface control logic, processing an optical-to-electrical converted signal; and a base band/RF driver, converting the serial data generated by the digital signal processing logic or data transmitted directly from an external contact module according to the control signal generated from the interface control logic into data into a format of coaxial cable transmission, transmitting the data to a coaxial cable.

The multimedia data transmitter according to the present invention can transmit multimedia data such as an image, voice and a control signal whose media are different from each other through an optical transmission medium such as a plastic or a glass optical cable to a short or long distance. The multimedia data transmitter can secure a transmission channel free from electromagnetic wave (EMI) and disturbance that are characteristics of optical transmission media by serially transmitting each multimedia data through an optical medium. It is possible to simplify a transmission cable and transmit various media. In addition, it is possible to transmit multimedia information and control various interfaces.

Advantageous Effects

According to the present invention, the multimedia data transmitter produces the following effects.

First, an optical IC for transmitting integrated multimedia data can solve the problems that can be generated from transmitting data using a coaxial cable.

Second, it can integrate and operate conventional transmission modes and construct an efficient system using a plurality of users and monitors in one platform. In addition, it can provide very high efficiency of data transmission without regard to transmission distance.

Third, it can integrate and operate a system easily in comparison with conventional transmission modes and produce demands by geometric progression in a platform used region by expecting efficiency of material and human resources.

BRIEF DESCRIPTION OF DRAWINGS

The above and other objects, features and advantages of the present invention will be more apparent from the following detailed description taken in conjunction with the accompanying drawings, in which.

MODE FOR THE INVENTION

Figure 1:
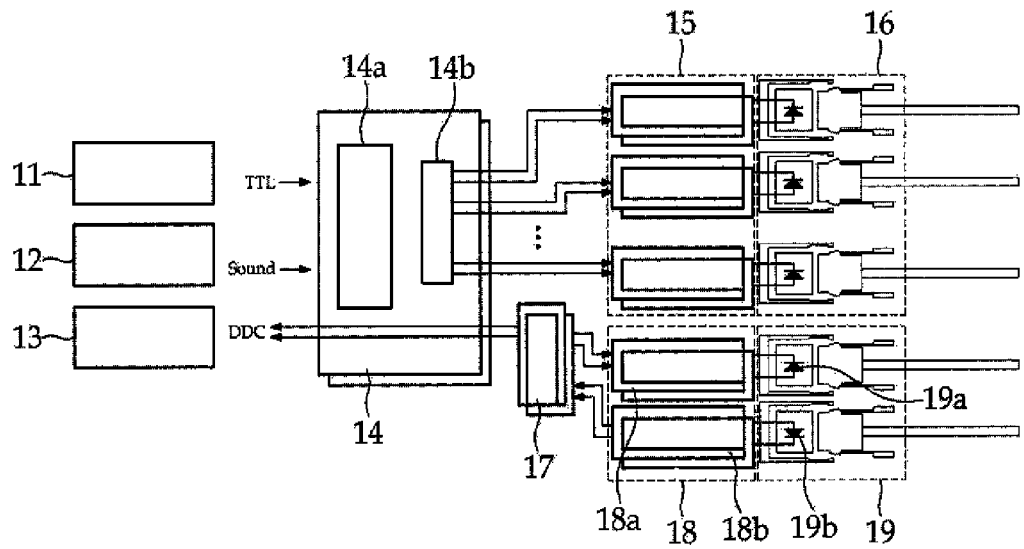
FIGS. 1a and 1b are views illustrating constructions of transmitting and receiving ends of a conventional optical transmission IC.
Figure 1:
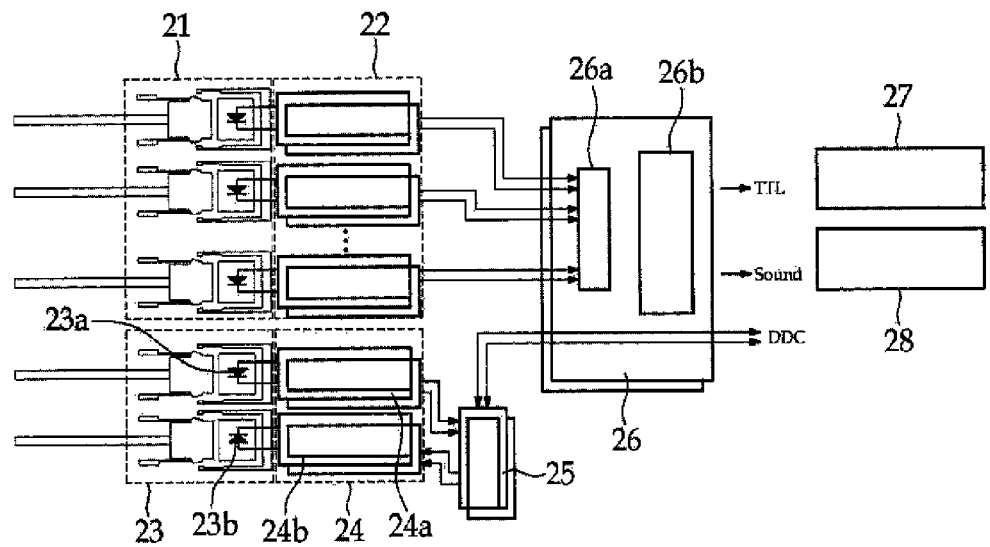

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

<First Embodiment>

Figure 2:
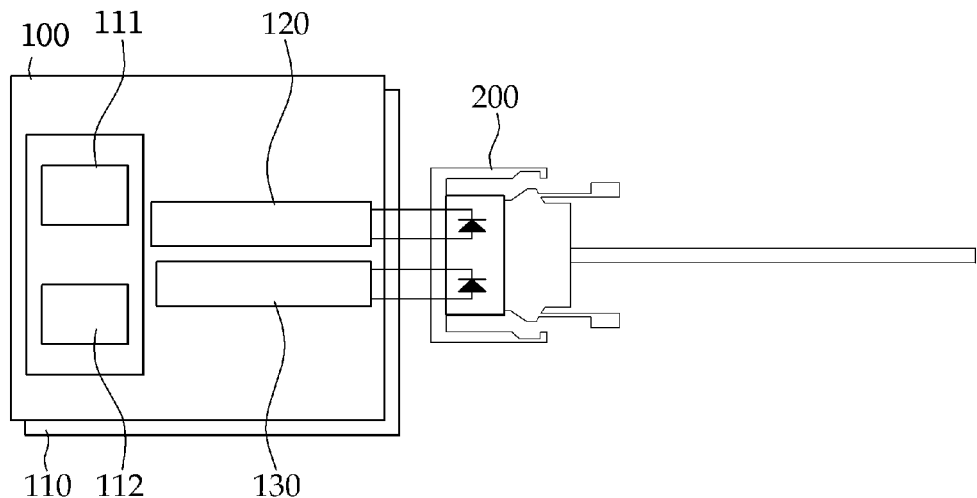
FIG. 2 is a view illustrating construction of a multimedia data transmitter according to a first exemplary embodiment of the present invention.
Figure 3:
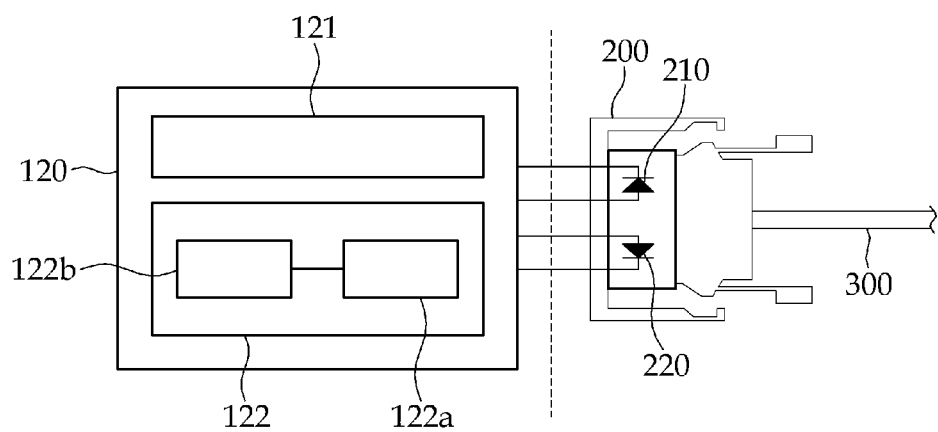
FIG. 3 is a view illustrating construction of an optical driver and an optical module according to a first exemplary embodiment of the present invention.
Figure 4:
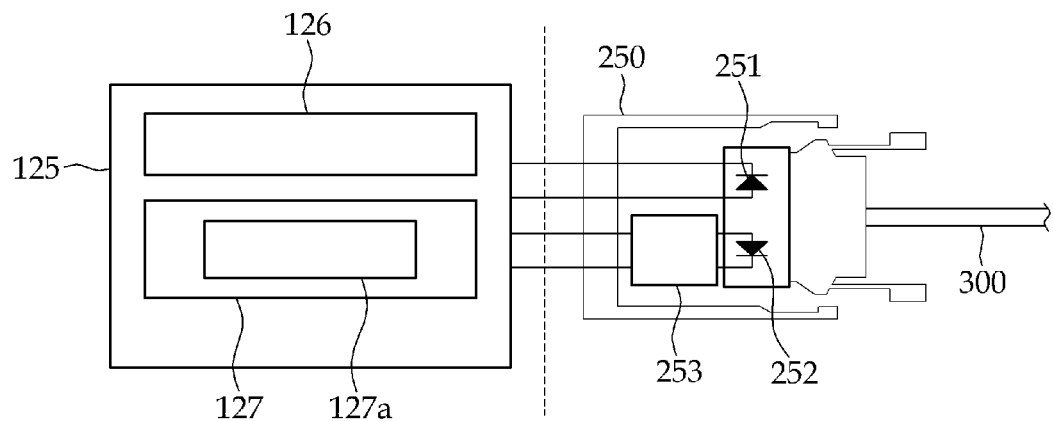
FIG. 4 is a view illustrating construction of an optical driver and an optical module according to a second exemplary embodiment of the present invention.

FIG. 2 is a view illustrating construction of a multimedia data transmitter according to a desirable embodiment of the present invention. FIGS. 3 and 4 are diagrams illustrating exemplary embodiments of an optical driver shown in FIG. 2.

A multimedia data transmitter 100 is divided into a digital signal processing unit, an analog signal processing unit and an optical signal transmitting/receiving unit.

The digital signal processing unit may convert multimedia data transmitted in different transmission formats (Dec. 24, 1948 bit TTL, TMDS/LVDS DATA) into a single transmission format, which may include a digital signal processing logic 110 converting parallel image data into serial data and an interface control logic 130 generating a control signal for transmission of data converted from the digital signal processing logic 110, performing interface of interface data.

The digital signal processing logic 110 may include a data format converter 111 converting multimedia data transmitted in different transmission format into a single transmission format and a parallel/serial converter 112 converting parallel image data converted from the data format converter 111 into serial data.

The analog signal processing unit may perform optical transmission of serial data generated from the digital signal processing logic 110 according to a control signal generated from the interface control logic 130, which includes an optical driver 120 processing a receiving signal that is optical-to-electrical converted.

The optical driver 120, as shown in FIG. 3, may include an optical drive logic 121 driving an optical module 200, performing optical transmission after converting digital serial data into analog signals and an optical receive logic 122 processing a received signal that is optical-to-electrical converted by the optical module 200, wherein the optical signal receive logic 122 may include a preamplifier 122a pre-amplifying the received signal that is optical-to-electrical converted by the optical module 200 and a current-limit amplifier 122b limiting a current level of the received signal amplified from the preamplifier 122a.

The optical signal transmitting and receiving unit may include the optical module 200 generating an optical signal and transmitting the signal to the optical cable 300, converting the optical signal received through the optical cable 300 into an electrical signal. The optical module 200 may include an optical generator 210 converting a transmitting signal that is electrical-to-optical converted by the optical drive logic 121 into an optical signal and transmitting the signal to the optical cable 300 and an optical receiver 220 optical-to-electrical converting the signal received through the optical cable 300 and transmitting an electrical signal to the optical signal receive logic 122.

Meanwhile, the optical driver 120 can be substituted for an optical driver 125 as shown in FIG. 4, if necessary. In this case, the optical driver 125 may include an optical drive logic 126 driving an optical module 250 and performing optical transmission after converting digital serial data into analog signals and an optical signal receive logic 127 processing a received signal that is optical-to-electrical converted by the optical module 250.

In this time, the optical module 250, unlike the optical module 200, may include an optical generator 251 transmitting an optical signal to an optical cable 300 by electrical-to-optical converting a transmitting signal by an optical drive logic 126, an optical receiver 252 optical-to-electrical converting a signal received through the optical cable 300 and converting into an electrical signal and a preamplifier 253 pre-amplifying an electrical signal converted by the optical receiver 252 and transmitting the signal to the optical signal receive logic 127. The optical signal receive logic 127 may include a current-limit amplifier 127a limiting a current level of the signal amplified by the preamplifier 253.

The multimedia data transmitter according to a desirable exemplary embodiment of the present invention may enable a data format converter 111 of the digital signal processing logic 110 processing digital signals to convert formats of input/output data. For example, mutual conversion for data transmission formats such as S-ATAx, LVDS and TMDS is performed.

Each data is controlled by a control signal to be suitable for characteristics of applications (PC, Set-top Box, Camera, video, etc). In other words, it requires data conversion into LVDS when a body is adjacent to a monitor, into S-ATA and LVDS when a general notebook monitor is connected to a general monitor not for a notebook and into LVDS and TMDS when a desktop is connected to a notebook monitor or a desktop computer is connected to a monitor far from the desktop computer. It must be possible to perform interface between transmission formats to apply to various cases. Accordingly, in the present invention the digital signal processing logic 110 is realized to perform data transmission between transmission modes at high speed.

Image data are separated into 8 bits of R,G,B signals respectively and transmitted.

Generally, serial transmission has more advantages than parallel transmission when a transmission speed is high. Now, serialization is emphasized as a data transmission mode.

Figure 5:
FIGS. 5a to 5c are timing diagrams of transmission of image data of the present invention.
Figure 5:
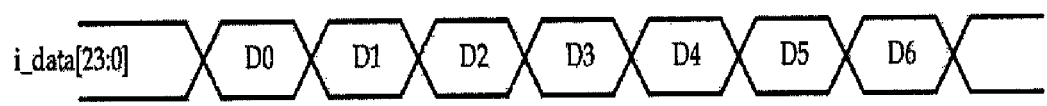
Figure 5:

Image information is synchronized to a clock falling edge of a clock (i_clK) signal as shown in FIG. 5c according to an image information enable (image enable)(data_en) signal generated from the interface control logic 130, and R,G,B data are transmitted as shown in FIG. 5b.

In this time, as not shown in drawings, the interface control logic 130 generates a sync signal (vertical and horizontal sync signal) and provides the signal to the digital signal processing logic 110 like the transmission of the image signal, thus performs simplex transmission.

As data format and sync signals are controlled in the simplex, and an image is transmitted to the digital signal processing logic 110 performing sync signal and format without forming a special control block. The simplex transmission is performed by synchronizing image data with image data, or only voice data is transmitted without additional sync signal.

Accordingly, the present invention receives TTL (12, 24 and 48 bit), LVDS and

TDMS transmission modes selectively as an input and transmits TTL (12, 24 and 48 bit), LVDS and TMDS formats as a final output.

Next, the parallel/serial converter 112 converts parallel data converted into the TTL (12, 24 and 48 bit), LVDS and TDMS format into serial data and then transmits the data to the optical drive 120 that is an analog signal processing unit. The serial transmission has a great advantage of simplicity of transmission lines. However, a coaxial cable has disadvantages of difficulty of long-distance transmission, severe data loss and weakness to interference, in comparison with an optical cable. Accordingly, the present invention is provided to design a transmitter that can be used solely for the optical cable to remove the disadvantages. However, when an image and an audio is optically transmitted, an application range is so narrow. In order to improve utility efficiency of the optical cable, the present invention is to provide various interfaces from the interface control logic 112 to directly use interfaces belonging to a category of a PC such as USB, IEEE 1394, local area network (LAN), a keyboard, a mouse, IRDA, DDC, Bluetooth, a reserved channel, etc.

Figure 6:
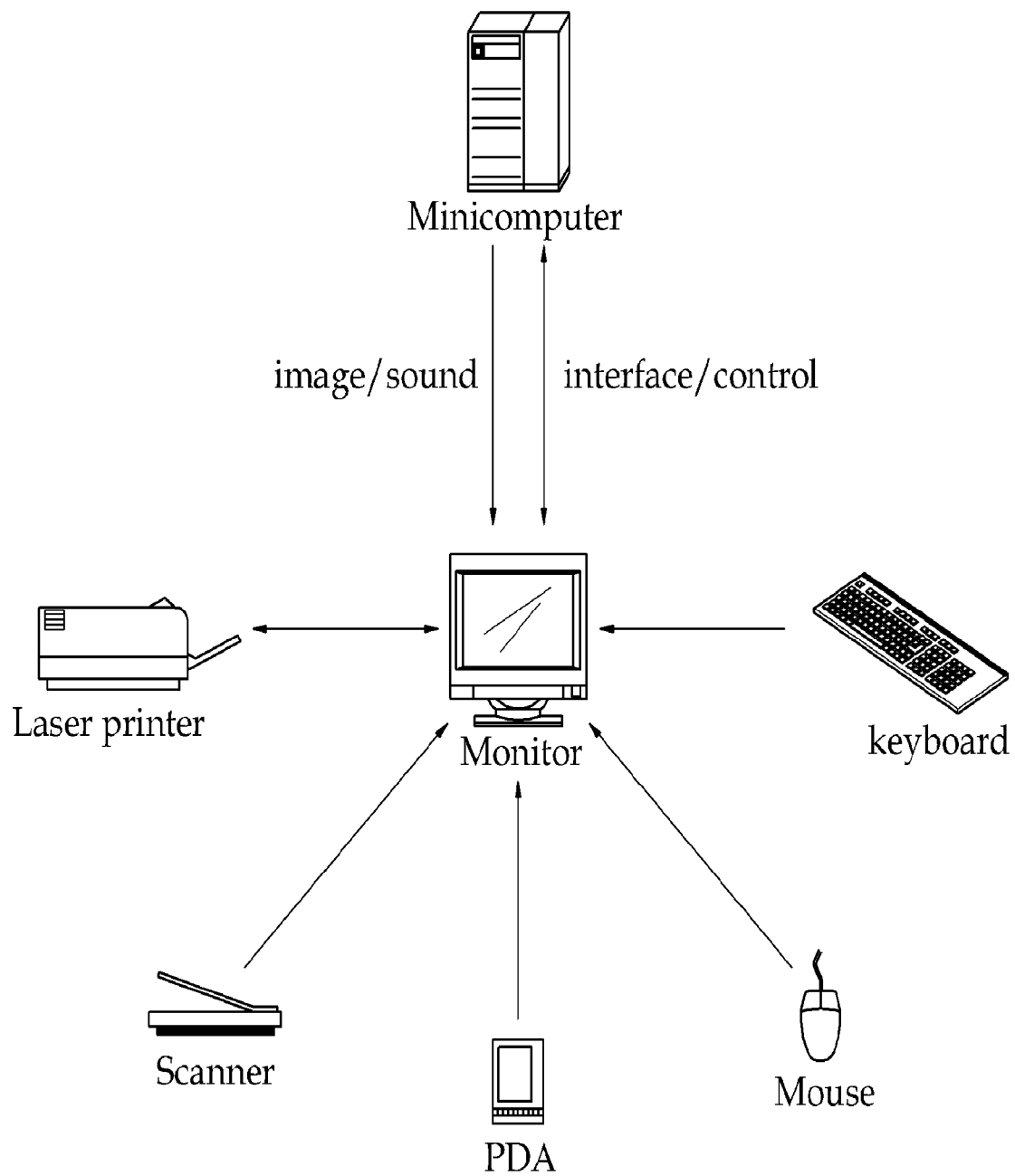
FIG. 6 is a view illustrating computer interface relationship based on a monitor in the present invention.

The functions, as shown in FIG. 6, have advantages of providing very simple environments for PC users and reducing difficulties in using due to disconnection. In other words, it can simplify computing environments greatly as users have only to use devices capable of performing direct input/output with the users such as a monitor, a keyboard, a mouse, a scanner, a laser printer, a personal digital assistant (PDA), etc. to be really used. In this time, the keyboard, the mouse, etc. are input or output devices, and the printer and PDA, etc. are bidirectional devices. Further, data transmission schemes such as the USB, the LAN, IEEE 1394, etc. are bidirectional transmission.

Likewise, devices that are connected to the monitor and used have unidirectional and bidirectional characteristics and it cannot be realized by using a conventional application-specific chip for optical transmission. The present invention is to perform data transmission for satisfying unidirectional and bidirectional characteristics using a digital signal processing logic and an interface control logic.

Meanwhile, the digital transmission data processed through the above process must be converted into an analog signal and transmitted, and the optical driver 120 converts and transmits the data. If it is just a coaxial cable, a current drive circuit is only added like LVDS or TMDS. If a channel medium is optically used, analog conversion for optical elements must be performed.

As shown in FIG. 3, an optical drive logic 121 of an optical driver 120 performs optical transmission by converting digital serial data converted through a parallel/serial converter 112 into an analog signal and driving an optical generator 210 of an optical module 200. The optical drive logic 121 uses optical transmission vertical-cavity surface-emitting laser (VCSEL). VCSEL has many advantages in structural characteristics, in comparison with a horizontal emitting laser. Particularly, VCSEL is a low power element for being easily connected to a pure single wavelength and single mode optical fiber. The VCSEL can perform optical transmission because of generating an optical analog signal. Generally, if data are transmitted through a conventional optical cable, VCSEL is used. In this time, most of optical drivers exist outside of a chip. The main reason why the drivers exist outside of the chip is that it is difficult to embody a mixed-mode where a digital domain and an analog domain coexist in the process. Further, there is no greater restriction to the optical communication even though the optical driver exists outside without need to exist inside. However, the present invention performs optical communication simply with one chip by locating the optical driver is located inside the multimedia data transmitter 100.

In addition, the optical driver 120 is equipped with an optical signal receive logic 122 processing a received signal that is optical-to-electrical converted by the optical module 200. The preamplifier 122a of the optical signal receive logic 122 pre-amplifies the signal optical-to-electrical converted by the optical module 200, and the current-limit amplifier 122b limits a current level of a signal amplified by the preamplifier 122a and transmits the signal to the digital signal processing logic 110 or the interface control logic 130 in a digital form.

In the optical nodule 200, the optical generator 210 electrical-to-optical converts a signal by the optical drive logic 121 and transmits an optical signal to the optical cable 300, and the optical receiver 220 optical-to-electrical converts a signal received by the optical cable 300 and transmits an electrical signal to the optical signal receive logic 122.

As described above, the optical signal receive logic 122 can be embodied by being equipped with a preamplifier and a current-limit amplifier. In another form, as shown in FIG. 4, the logic 122 can be embodied only with the preamplifier 253 in the optical module 250. It can become distant from the optical module to the optical driver according a state and an environment of application domains to be fitted to the environments.

Explaining the optical nodule 250 and the optical signal receive logic 127 shown in FIG. 4 in short, the optical generator 251 transmits a signal electrical-to-optical converted by the optical drive logic 126 to the optical cable 300. The optical receiver 252 optical-to-electrical converts a signal received by the optical cable 300 and converts into an electrical signal. In addition, the preamplifier 253 pre-amplifies the electrical signal converted by the optical receiver 252 and transmits the signal to the optical signal receive logic 127. Further, the optical signal receiving logic 127 limits a current level of the signal amplified by the preamplifier 253 and transmits the signal to the digital signal processing logic 110 or the interface control logic 130.

<Second Embodiment>

Another characteristic of the present invention lies in compatibility for interface modules contacted to a conventional coaxial cable.

Figure 7:
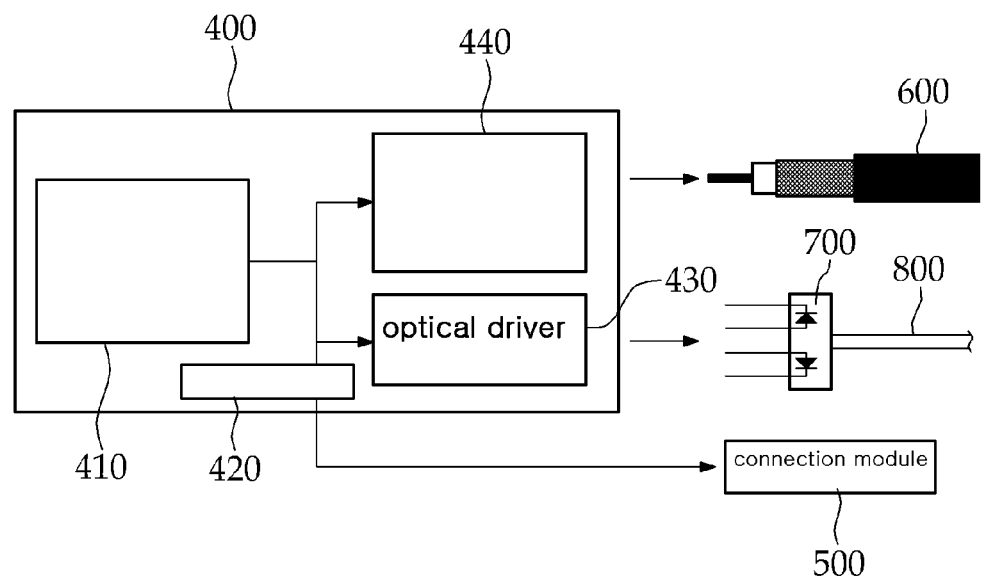
FIG. 7 is a view illustrating construction of a multimedia data transmitter according to a second exemplary embodiment of the present invention.

FIG. 7 shows another exemplary embodiment of the present invention. A reference number 410 indicates a digital signal processing logic converting multimedia data transmitted in a format of different transmission nodes formats into a format of a single transmission node and converting image data formed in parallel into serial data. A reference number 420 indicates an interface control logic generating a control signal for transmitting data converted from the digital signal processing logic 410 and transmitting data transmitted through an external contact module 500, and performing interface of interface data.

In addition, a reference number 430 indicates an optical driver performing optical transmission of serial data generated from the digital signal processing logic 310 according to a control signal generated from the interface control logic 420 and data directly transmitted from the external contact module 500, and processing a signal optical-to-electrical converted. A reference number 440 indicates a base band/RF driver converting serial data generated from the digital signal processing logic 410 according to a control signal generated from the interface control logic 420 or data directly transmitted from the external contact module 500 into a format of transmission mode of the coaxial cable 600.

According to another exemplary embodiment of the present invention, it can transmit data to the contact modules 500. In addition, it can transmit data using the coaxial cable 600 and the optical cable 800.

In this time, the contact module 500 has an advantage of using various transmission media because there is low possibility that problems are generated when data are transmitted from inside of PCs or general data except an image or a voice are transmitted without additional format conversion or modulation.

The digital signal processing logic 410, the optical driver 430, the optical module 700, etc as shown in FIG. 7 is the same configuration of operation as the digital signal processing logic 410, the optical driver 120 and the optical module 200 as shown in FIG. 2, and they perform the same function. Accordingly, explanation about them will be omitted for convenience.

INDUSTRIAL APPLICABILITY

As described above, the multimedia data transmitter can be used for devices transmitting data from a monitor to connected devices at a close range or at a long distance according to the present invention. Particularly, it can be used for all devices transmitting various multimedia data to an optical cable.

The invention claimed is:

1. A multimedia data transmitter, comprising: a digital signal processing logic, converting multimedia data transmitted in different transmission formats into data of a single transmission format, converting parallel image data into serial image data; an interface control logic, generating a control signal for transmission of the data converted by the digital signal processing logic, interfacing interface data; and an optical driver, performing optical transmission of the serial data generated by the digital signal processing logic according to the control signal generated by the interface control logic, processing an optical-to-electrical converted signal; and wherein the optical driver comprises: an optical drive logic, converting a digital serial data into an analog signal, performing optical transmission through driving an optical module; and an optical signal receiving logic to process a received signal that is optical-to-electrical converted by the optical module; and wherein the optical signal receiving logic comprises: a preamplifier pre-amplifying the received signal that is optical-to-electrical converted by the optical module; and a current-limit amplifier limiting a current level of the received signal pre-amplified by the preamplifier.

2. The multimedia data transmitter of claim 1, further comprising: an optical module, transmitting an optical signal to an optical cable through operating with the optical driver, converting the optical signal received through the optical cable into an electrical signal.

3. The multimedia data transmitter of claim 1, wherein the digital signal processing logic comprises: a data format converter converting multimedia data transmitted in different transmission formats into a single transmission format; and a parallel/serial converter converting parallel image data converted by the data format converter into serial data.

4. The multimedia data transmitter of claim 1, wherein the optical module comprises: an optical generator, electrical-to-optical converting the transmission signal outputted by the optical drive logic, transmitting the converted optical signal to an optical cable; and an optical receiver, optical-to-electrical converting the optical signal received by the optical cable, transmitting the converted electrical signal to the optical signal receiving logic.

5. The multimedia data transmitter of claim 1, wherein the optical module comprises: an optical generator, electrical-to-optical converting the signal transmitted by the optical drive logic, transmitting the optical signal to the optical cable; an optical receiver for optical-to-electrical converting the signal received by the optical cable into an electrical signal; and a preamplifier, pre-amplifying the electrical signal converted by the optical receiver, transmitting the pre-amplified signal to the optical signal receiving logic.

6. The multimedia data transmitter of claim 1, wherein the interface control logic performs unidirectional or bidirectional data communication with devices such as USB, IEEE 1394, LAN, PDA, keyboard and mouse.

7. A multimedia data transmitter, comprising:
a digital signal processing logic, converting multimedia data transmitted in different transmission formats into data of a single transmission format, converting parallel image data into serial image data;
an interface control logic, generating a control signal for transmission of the data converted by the digital signal processing logic, interfacing interface data; and
an optical driver, performing optical transmission of the serial data generated by the digital signal processing logic according to the control signal generated by the interface control logic, processing an optical-to-electrical converted signal; and
wherein the optical driver comprises:
an optical drive logic, converting a digital serial data into an analog signal, performing optical transmission through driving an optical module; and an optical signal receiving logic to process a received signal that is optical-to-electrical converted by the optical module; and wherein
the optical module comprises: an optical generator, electrical-to-optical converting the signal transmitted by the optical drive logic, transmitting the optical signal to the optical cable; an optical receiver for optical-to-electrical converting the signal received by the optical cable into an electrical signal; and a preamplifier, pre-amplifying the electrical signal converted by the optical receiver, transmitting the pre-amplified signal to the optical signal receiving logic; and wherein the optical signal receiving logic comprises a current-limit amplifier limiting a current level of the signal amplified by the preamplifier.

\* \* \* \* \*